United States Patent
Chen et al.

(10) Patent No.: US 11,441,023 B2
(45) Date of Patent: *Sep. 13, 2022

(54) POLYETHYLENE FILMS AND METHODS OF MAKING THE SAME

(71) Applicant: ExxonMobil Chemical Patents Inc., Baytown, TX (US)

(72) Inventors: Keran Chen, Shanghai (CN); Yong Yang, Kingwood, TX (US); Ling Ge, Shanghai (CN); Xiao-Chuan Wang, Shanghai (CN); Zhen-Yu Zhu, Shanghai (CN); LeiLei Ma, Shanghai (CN); Xin Hao Cai, Shanghai (CN); Gregory K. Hall, Humble, TX (US); Caiguo Gong, Houston, TX (US); Jean-Marc C. De Koninck, Hamme-Mille (BE); Robert J. Wittenbrink, Kingwood, TX (US)

(73) Assignee: ExxonMobil Chemical Patents Inc., Baytown, TX (US)

(*) Notice: Subject to any disclaimer, the term of this patent is extended or adjusted under 35 U.S.C. 154(b) by 92 days.

This patent is subject to a terminal disclaimer.

(21) Appl. No.: 16/344,692

(22) PCT Filed: Apr. 27, 2018

(86) PCT No.: PCT/US2018/029922
§ 371 (c)(1),
(2) Date: Apr. 24, 2019

(87) PCT Pub. No.: WO2019/209334
PCT Pub. Date: Oct. 31, 2019

(65) Prior Publication Data
US 2021/0363336 A1   Nov. 25, 2021

(51) Int. Cl.
*C08L 23/08* (2006.01)
*B32B 27/08* (2006.01)
(Continued)

(52) U.S. Cl.
CPC .......... *C08L 23/0815* (2013.01); *B32B 27/08* (2013.01); *B32B 27/32* (2013.01);
(Continued)

(58) Field of Classification Search
CPC ..... C08L 23/0815; B32B 27/08; B32B 27/32; B32B 2250/03; B32B 2250/242;
(Continued)

(56) References Cited

U.S. PATENT DOCUMENTS

| | | | |
|---|---|---|---|
| 4,543,399 A | 9/1985 | Jenkins, III et al. | |
| 4,588,790 A | 5/1986 | Jenkins, III et al. | |

(Continued)

FOREIGN PATENT DOCUMENTS

| | | |
|---|---|---|
| GB | 2397065 | 7/2004 |
| JP | 2005-199514 | 7/2005 |

(Continued)

OTHER PUBLICATIONS http://www.matweb.com/search/datasheet.aspx?matguid=c83a04f51282496bb0c829372e884d77 (Year: 2022).*

(Continued)

*Primary Examiner* — Samir Shah
(74) *Attorney, Agent, or Firm* — ExxonMobil Chemical Patents Inc.—Law Department (57) ABSTRACT

A film, preferably, a multi-layered film, including a polymer composition, wherein the polymer composition includes: within a range from 1 wt % to 25 wt % of a cyclic olefin copolymer based on the weight of the polymer composition, and within a range from 75 wt % to 99 wt % (the remainder of material) of a polyethylene based on the weight of the (Continued)

polymer composition, wherein the cyclic olefin copolymer has a glass transition temperature (T.sub.g) of at least 80.degree. C. The films may be used in shrink packaging application.

24 Claims, 4 Drawing Sheets

(51) Int. Cl.
  B32B 27/32    (2006.01)
  C08J 5/18     (2006.01)
  B29C 48/08    (2019.01)
  B29C 48/21    (2019.01)
  B29K 23/00    (2006.01)

(52) U.S. Cl.
  CPC ............. *C08J 5/18* (2013.01); *B29C 48/08* (2019.02); *B29C 48/21* (2019.02); *B29K 2023/0625* (2013.01); *B29K 2995/0063* (2013.01); *B32B 2250/03* (2013.01); *B32B 2250/242* (2013.01); *B32B 2250/40* (2013.01); *B32B 2307/72* (2013.01); *C08J 2323/08* (2013.01); *C08J 2445/00* (2013.01); *C08L 2203/162* (2013.01)

(58) Field of Classification Search
  CPC .... B32B 2250/40; B32B 2250/04; C08J 5/18; C08J 2323/08; B29C 48/08; B29C 48/21; B29K 2023/0625; B29K 2995/0063
  See application file for complete search history.

(56) References Cited

U.S. PATENT DOCUMENTS

| | | | |
|---|---|---|---|
| 5,028,670 A | 7/1991 | Chinh et al. | |
| 5,254,709 A | 10/1993 | Hunter | |
| 5,317,036 A | 5/1994 | Brady, III et al. | |
| 5,352,749 A | 10/1994 | DeChellis et al. | |
| 5,405,922 A | 4/1995 | DeChellis et al. | |
| 5,436,304 A | 7/1995 | Griffin et al. | |
| 5,453,471 A | 9/1995 | Bernier et al. | |
| 5,462,999 A | 10/1995 | Griffin et al. | |
| 5,466,649 A | 11/1995 | Jejelowo | |
| 5,616,661 A | 4/1997 | Eisinger et al. | |
| 5,635,573 A | 6/1997 | Harrington et al. | |
| 5,668,228 A | 9/1997 | Chinh et al. | |
| 6,225,426 B1 | 5/2001 | Gillis et al. | |
| 6,444,836 B1 | 9/2002 | Hess | |
| 6,476,171 B1 | 11/2002 | Lue et al. | |
| 6,870,010 B1 | 3/2005 | Lue et al. | |
| 6,872,462 B2 | 3/2005 | Roberts et al. | |
| 7,052,750 B2 | 5/2006 | Niepelt | |
| 7,179,521 B2 | 2/2007 | Arthurs et al. | |
| 7,727,620 B2 | 6/2010 | Yamada et al. | |
| 7,888,414 B2 | 2/2011 | Geibin et al. | |
| 7,947,769 B2 | 5/2011 | Gelbin et al. | |
| 7,951,873 B2 | 5/2011 | Best et al. | |
| 8,008,383 B2 | 8/2011 | Gelbin et al. | |
| 8,048,946 B2 | 11/2011 | Hill et al. | |
| 8,092,920 B2 | 1/2012 | Saavedra et al. | |
| 8,118,170 B2 | 2/2012 | Sato | |
| 8,258,214 B2 | 9/2012 | Zahalka et al. | |
| 8,663,810 B2 | 3/2014 | Ambroise et al. | |
| 2004/0142195 A1 | 7/2004 | Roberts et al. | |
| 2004/0234800 A1 | 11/2004 | Arthurs et al. | |
| 2005/0113494 A1 | 5/2005 | Bobsein et al. | |
| 2005/0214557 A1 | 9/2005 | Arthurs et al. | |
| 2006/0057410 A1 | 3/2006 | Saavedra et al. | |
| 2006/0159878 A1 | 7/2006 | Wakai et al. | |
| 2007/0021537 A1 | 1/2007 | Chafin et al. | |
| 2007/0098933 A1 | 5/2007 | Opuszko et al. | |
| 2007/0110853 A1 | 5/2007 | Bekele | |
| 2007/0212539 A1 | 9/2007 | Yamada et al. | |
| 2008/0292821 A1 | 11/2008 | Dayrit et al. | |
| 2009/0068486 A1 | 3/2009 | Blackwell et al. | |
| 2009/0286024 A1* | 11/2009 | Lu | B32B 1/00 428/218 |
| 2009/0326112 A1 | 12/2009 | Gelbin et al. | |
| 2011/0212338 A1 | 9/2011 | Ambroise | |
| 2011/0256373 A1 | 10/2011 | Tatarka et al. | |
| 2013/0095338 A1 | 4/2013 | Lu | |
| 2013/0190434 A1 | 7/2013 | Zahalka | |
| 2013/0225738 A1 | 8/2013 | Osby et al. | |
| 2014/0045981 A1 | 2/2014 | Zahalka et al. | |
| 2014/0134430 A1 | 5/2014 | Mitchell et al. | |
| 2014/0353197 A1 | 12/2014 | Hu et al. | |
| 2015/0010740 A1 | 1/2015 | Chen et al. | |
| 2015/0010741 A1 | 1/2015 | Pham et al. | |
| 2015/0232221 A1* | 8/2015 | Jacobs | B32B 27/327 428/35.2 |
| 2015/0273803 A1 | 10/2015 | Maruichi et al. | |
| 2016/0136884 A1 | 5/2016 | Kneale | |
| 2016/0368251 A1 | 12/2016 | Banno et al. | |
| 2017/0233516 A1 | 8/2017 | Yang et al. | |
| 2017/0283116 A1* | 10/2017 | Mitchell | B65C 3/26 |
| 2018/0333938 A1 | 11/2018 | Cheng et al. | |

FOREIGN PATENT DOCUMENTS

| | | |
|---|---|---|
| JP | 2005-254458 | 9/2005 |
| JP | 4125917 | 7/2008 |
| JP | 2011-104816 | 6/2011 |
| JP | 5462597 | 4/2014 |
| JP | 2015-199797 | 11/2015 |
| WO | 2004/098882 | 11/2004 |
| WO | 2014/141820 | 9/2014 |
| WO | 2015/004310 | 1/2015 |
| WO | 2015/004311 | 1/2015 |
| WO | 2015/004312 | 1/2015 |
| WO | 2015/004313 | 1/2015 |

OTHER PUBLICATIONS

Jester, Randy (2002) "Heat Seal Characteristics of Cyclic Olefin Copolymer/Polyethylene Blends," in TAPPI 2002 Place Conference, Boston, Massachusetts, 13 pgs.

Constant, David R. (2002) "Cyclic Olefinic Copolymers as Non-Migrating Polymeric Slip Additives in LDPE Cast Films," in ANTEC 2002 Conference, San Francisco, California, 5 pgs.

Jester, Randy (2005) "High Aroma Barrier Combined with Low Extractables," in 2005 Place Conference, Las Vegas, Nevada, 11 pgs.

Tatarka, Paul D. (2007) "Improved Properties and Cost Efficiencies of Cyclic Olefin Copolymer Enhanced Forming Films," SPE Annual Technical Conference, pp. 1145-1149.

Tatarka, Paul D. (2008) "Polyolefin Film Enhancement Using Cyclic Olefin Copolymers for Retort Applications," in SPE Polyolefin & Flexpack Conference, Feb. 25, 2008, 40 pgs.

Tatarka, Paul D. (2009) "Thermoforming Enhancement With Cyclic Olefin Copolymers," in SPE International Polyolefins Conference, Houston, Texas Feb. 22, 2009, 33 pgs.

Aubee, Norman et al. (2009) "Blending of Cyclic Olefins in Single Site LLDPE (sLLDPE) for Improved Bubble Stability and Output Rates on Blow Film Extrusion Process," in SPE International Polyolefins Conf., Houston, Texas, Feb. 22, 2009, 6 pgs.

TOPAS Advanced Polymers' product brochure, "Packaging Brochure (English)", https://topas.com/tech-center/brochures, (accessed Feb. 27, 2018).

Jester, Randy (2010) "COC Enhanced Polyolefin Films for Shrink Sleeves and Labels," in AWA International Sleeve & Label Conf., Chicago, Illinois, 19 pgs.

Dyer, David et al. (2011) "Sequential shrink photolithography for plastic microlens arrays," Applied Physics Letters, v.99(3), pp. 034102/1-034102/3.

Hatke, W. (1997) "Properties and applications of cycloolefin copolymer (coc) films", Kunststoffe, vol. 87, pp. 58-60.

(56) References Cited

OTHER PUBLICATIONS

Lamonte et al. (2000) "Uses and Processing of Cyclic Olefin Copolymers," Thermoforming Conference, Plastics Engineering, pp. 51-55.
Jester, Randy (2007) "Cyclic-Olefin Copolymer—A High Performance Modifier for Conventional Polyolefins," in *Spa Polyolefins Conference*, Houston, Texas (Feb. 25, 2007), 4 pgs.

\* cited by examiner

POLYETHYLENE FILMS AND METHODS OF MAKING THE SAME

STATEMENT OF RELATED APPLICATIONS

This application is the 35 USC § 371 National Stage application for PCT/US2018/029922, filed Apr. 27, 2018.

FIELD OF THE INVENTION

The present disclosure relates to polyethylene films, and in particular, to multi-layered polyethylene films having at least a layer comprising a cyclic-olefin copolymer.

BACKGROUND OF THE INVENTION

Coextruded blown films are widely used in various applications. Film properties are often subject to the combined effect of polymer compositions selected for the different layers. In order to address requirements of particular applications, film producers have to accordingly highlight certain film properties while balancing different properties repulsive to each other.

Primary characteristics that are required for shrink films are good shrinkage in both machine (MD) and transverse (TD) directions, and excellent strength after shrinkage, often referred to as "load retention resistance." Optical properties such as low haze and high gloss that result in a brilliant print appearance are also important. Shrink films produced from blown film processing often possess sufficient MD shrink because it is easy to stretch and orient films in the machine direction. Sufficient TD shrink is important for many aspects but is difficult to achieve. Low density polyethylene (LDPE) currently dominates the shrink films market segment with its good shrink behavior, especially in TD.

LDPE is the polymer of choice in shrink applications, both in collation shrink as pallet packaging. Due to its long chain branching, the polymer can be easily oriented during the blown film process resulting in the desired shrink properties. MD shrink is typically acceptable, as the majority of the orientation of the blown film occurs in the machine direction. The TD orientation is often obtained by selecting a large blow ratio of the film. However, this is not always possible or causes a too high amount of waste.

Certain multimodal polyethylene formulations may exhibit significant benefits over LDPE when blended with other polyethylenes such as linear low density polyethylene (LLDPE) and high density polyethylene (HDPE). The multimodal polyethylene formulations offer a higher performance on most key attributes for shrink films, but often times TD shrink is compromised.

Publications of interest include U.S. Pat. Nos. 7,727,620; 7,179,521; 6,872,462; U.S. Patent Publication Nos. 2015/0010741; 2014/0353197; 2011/0256373; 2007/00098933; 2006/0159878; and PCT Publication No. WO 2014/141820. Other publications of interest include:

Randy Jester, "Heat Seal Characteristics of Cyclic Olefin Copolymer/Polyethylene Blends," in TAPPI 2002 PLACE CONFERENCE, Boston, Mass. (2002);

David R. Constant, "Cyclic Olefinic Copolymers as Non-Migrating Polymeric Slip Additives in LDPE Cast Films," in ANTEC 2002 CONFERENCE, San Francisco, Calif. (2002);

Ronald R. Lamonte, "Stiffer, Thinner, Packaging Films with Improved Sealing Using Cyclic Olefin Copolymers," in FLEXPAC CONFERENCE, Amsterdam, Holland (November 2003);

Randy Jester, "High Aroma Barrier Combined with Low Extractables," in 2005 PLACE CONFERENCE, Las Vegas, Nev. (Sep. 27, 2005);

Randy Jester, "Cyclic-Olefin Copolymer—A High Performance Modifier for Conventional Polyolefins," in SPA POLYOLEFINS CONFERENCE, Houston, Tex. (Feb. 25, 2007);

Paul D. Tatarka, "Improved Properties and Cost Efficiencies of Cyclic Olefin Copolymer Enhanced Forming Films," SPE ANNUAL TECHNICAL CONFERENCE (May 7, 2007);

Paul D. Tatarka, "Polyolefin Film Enhancement Using Cyclic Olefin Copolymers for Retort Applications," in SPE POLYOLEFIN & FLEXPACK CONFERENCE, Feb. 25, 2008;

Paul D. Tatarka, "Thermoforming Enhancement With Cyclic Olefin Copolymers," in SPE INTERNATIONAL POLYOLEFINS CONFERENCE, Houston, Tex. (Feb. 22, 2009);

Norman Aubee & Timothy Kneale, "Blending of Cyclic Olefins in Single Site LLDPE (sLLDPE) for Improved Bubble Stability and Output Rates on Blow Film Extrusion Process," in SPE INTERNATIONAL POLYOLEFINS CONFERENCE, Houston, Tex. (Feb. 22, 2009);

TOPAS Advanced Polymers' product brochure, "Packaging Brochure (English)", https://topas.com/tech-center/brochures, (accessed Feb. 27, 2018); and Randy Jester, "COC Enhanced Polyolefin Films for Shrink Sleeves and Labels," in AWA INTERNATIONAL SLEEVE & LABEL CONFERENCE, Chicago, Ill. (2010).

Therefore, there is an industry-wide need to find components or compositions that improve TD shrink with maintained mechanical and optical properties, and more preferably with enhancement in one or more properties, which can enable polyethylene growth through opportunities such as down gauging.

SUMMARY OF THE INVENTION

Disclosed is a film suitable, for example, for shrink wrap applications, comprising (or consisting essentially of or consisting of) a polymer composition, wherein the polymer composition comprises: within a range from 1, or 2, or 5 wt % to 15, or 20, or 25 wt % of a cyclic olefin copolymer based on the weight of the polymer composition, and within a range from 75, or 80, or 85 wt % to 95, or 98, or 99 wt % (the remainder of material) of a polyethylene based on the weight of the polymer composition, wherein the cyclic olefin copolymer has a glass transition temperature ($T_g$) of at least 80, or 90, or 100° C. (or within a range from 80, or 90° C. to 140, or 160, or 200° C.). The films can be formed by any suitable means such as casting or blowing technologies.

DETAILED DESCRIPTION

Various specific embodiments, versions of the invention will now be described, including preferred embodiments and definitions that are adopted herein. While the following detailed description gives specific preferred embodiments, those skilled in the art will appreciate that these embodiments are exemplary only, and that the invention can be practiced in other ways. Any reference to the "invention" may refer to one or more, but not necessarily all, of the inventions defined by the claims. The use of headings is for purposes of convenience only and does not limit the scope of the invention.

As used herein, a "polymer" may be used to refer to homopolymers, copolymers, interpolymers, terpolymers, etc. A "polymer" has two or more of the same or different monomer units. A "homopolymer" is a polymer having monomer units that are the same. A "copolymer" is a polymer having two or more monomer units that are different from each other. A "terpolymer" is a polymer having three monomer units that are different from each other. The term "different" as used to refer to monomer units indicates that the monomer units differ from each other by at least one atom or are different isomerically. Accordingly, the definition of copolymer, as used herein, includes terpolymers and the like. Likewise, the definition of polymer, as used herein, includes copolymers and the like.

As used herein, when a polymer is referred to as comprising a monomer, the monomer is present in the polymer in the polymerized form of the monomer or in the derivative form of the monomer.

As used herein, when a polymer is said to comprise a certain percentage, wt %, of a monomer, that percentage of monomer is based on the total amount of monomer units in the polymer.

For purposes of this invention and the claims thereto, an ethylene polymer having a density of 0.910 to 0.940 g/cm$^3$ is referred to as a "low density polyethylene" (LDPE); an ethylene polymer having a density of 0.890 to 0.930 g/cm$^3$, typically from 0.915 to 0.930 g/cm$^3$, that is linear and does not contain a substantial amount of long-chain branching is referred to as "linear low density polyethylene" (LLDPE) and can be produced with conventional Ziegler-Natta catalysts, vanadium catalysts, or with metallocene catalysts in gas phase reactors, high pressure tubular reactors, and/or in slurry reactors and/or with any of the disclosed catalysts in solution reactors ("linear" means that the polyethylene has no or only a few long-chain branches, typically referred to as a g'vis of 0.97 or above, preferably 0.98 or above); and an ethylene polymer having a density of more than 0.940 g/cm$^3$ is referred to as a "high density polyethylene" (HDPE). Most preferably the LLDPE's useful in films herein are produced in a gas phase reactor using metallocene catalysts.

As used herein, a composition "free of a component" refers to a composition substantially devoid of the component, or comprising the component in an amount of less than about 0.01 wt %, by weight of the total composition.

The present invention solves the problem of sufficient TD strength by using a new film structure comprising cyclic-olefin copolymer (COC). The blown films produced from low to medium levels (for example, 6%) of COC in overall PE components exhibit a combination of properties which have not been possible in the prior art, including significantly enhanced TD shrink with maintained sufficient MD shrink; significantly enhanced stiffness, which will result in better load retention resistance; better toughness and stiffness balance; maintained excellent optical properties; and easily processable under drop-in processing conditions with the potential of higher output rates. These improvements can also enable significant down gauging opportunities with required performance on shrinkage, stiffness/toughness balance, holding force, and sealing.

Cyclic-Olefin Copolymers

As used herein, the term "cyclic-olefin copolymer" (COC) refers to a copolymer comprising 50 wt % or more ethylene derived units, the remainder being cyclic olefin derived units selected from $C_5$ to $C_8$, or $C_{12}$, or $C_{16}$, or $C_{20}$ olefins comprising at least one $C_5$ to $C_8$ cyclic structure, such as, for example, bicyclo compounds such as bicyclo-(2,3,1)-heptene-2. Preferably, the cyclic olefin derived unit is selected from $C_5$, or $C_6$ to $C_8$, or $C_{10}$, or $C_{12}$, or $C_{20}$ cyclic-olefin derived units, and more preferably bicyclic olefin derived units which are cyclic olefins containing a bridging hydrocarbon moiety that forms two rings in the overall structure such as in bicyclo-(2,3,1)-heptene-2 (norbornenes). Most preferably, the cyclic olefin derived units are selected from norbornenes, tetracyclododecene, or a combination thereof.

In any embodiment, the cyclic olefin content (cyclic olefin derived units) of the COC's useful herein is 60, or 65, or 70 wt % or more, or within a range from 40, or 45, or 50, or 55, or 60, or 65, or 70 wt % to 80, or 85, or 90 wt %, by weight of the COC.

The cyclic-olefin copolymers can be made by any suitable polymerization means. In any embodiment, the cyclic olefin monomer that is combined with ethylene monomers in the polymerization process is selected from $C_5$ to $C_8$, or $C_{12}$, or $C_{16}$, or $C_{20}$ olefins comprising at least one $C_8$ to $C_8$ cyclic structure, such as, for example, bicyclo compounds such as bicyclo-(2,3,1)-heptene-2. Preferably, the cyclic olefin is selected from $C_5$, or $C_6$ to $C_8$, or $C_{10}$, or $C_{12}$, or $C_{20}$ cyclic olefins, and more preferably bicyclic olefins which are cyclic olefins containing a bridging hydrocarbon moiety that forms two rings in the overall structure such as in bicyclo-(2,3,1)-heptene-2 (norbornenes). Most preferably, the cyclic olefins used to make the COC are selected from norbornenes, tetracyclododecene, and substituted versions thereof. In order to effect the polymerization process upon combining, as well as combining at a desirable temperature, the components are preferably combined at a pressure of at least 0.8, or 1, or 2, or 3 MPa; or within a range from 0.8, or 1, or 2, or 3 MPa to 4, or 6, or 8, or 10 MPa. This pressure can come from the addition of the ethylene and/or other gases in the polymerization reactor, and is of course influenced by the temperature of the reactor. The level of ethylene and cyclic olefin is adjusted to obtain the desired catalytic activity as well as desired level of cyclic olefin comonomer incorporation into the polyethylenes described herein. In any embodiment, the combining of the monomers with catalyst can take place at a reaction temperature, the average temperature within the vessel or reactor used to combine the components to effect polymerization, within a range from 80, or 85, or 90, or 100° C. to 120, or 130, or 140, or 150° C.

In any embodiment, the cyclic olefin copolymer has a glass transition temperature ($T_g$) of at least 80° C., 90° C., 100° C., 110° C., 120° C., 130° C., 140° C., 150° C., 160° C., 170° C., 180° C., 190° C., or 200° C., or within a range from 80° C. to 110° C., 140° C., 160° C., 170° C., 190° C., or 200° C., as measured by DSC method.

In any embodiment, the cyclic olefin copolymer has an $I_2$ (2.16 kg/190° C.) within a range from 0.01, or 0.05, or 0.1 g/10 min to 1, or 1.5, or 2 g/10 min Polyethylene As used herein, the term "polyethylene" alone refers to polymers of ethylene-derived units and optional $C_3$ to $C_{12}$ α-olefin derived units, excluding cyclic olefin monomer units. The terms "polyethylene polymer," "polyethylene," "ethylene polymer," "ethylene copolymer," and "ethylene based polymer" are interchangeably used herein.

The polyethylene polymers may include low density polyethylenes (LDPE) made using a conventional high-pressure process, linear low density polyethylenes (LLDPE) produced using a Ziegler-Natta catalyst or a metallocene catalyst.

Low Density Polyethylenes (LDPE)

The LDPE used herein have an $I_{2.16}$ of from 0.05 to 1.5 g/10 min Suitably, the LDPE has a fractional $I_{2.16}$<1.2 g/10 min, preferably <1.0 g/10 min and optionally <0.8 g/10 min. The LDPE may even have an $I_{2.16}$<0.5 or <0.25 g/10 min. The LDPE with a lower $I_{2.16}$, may be used in lower concentrations in at least a layer to ensure that the overall $I_{2.16}$ of the polymer composition as a whole remains amenable to coextrusion with the existing equipment.

The LDPE's may be made in a tubular or autoclave reactor. The density may vary from 0.910 to 0.940 g/cm$^3$, and is preferably at least 0.920 g/cm$^3$. The Mw/Mn as determined by GPC DRI may be at least 3. The LDPE may have a medium to broad molecular weight distribution defined herein as having an Mw/Mn as determined by GPC of >4 and a high degree of long chain branching (LCB). The LDPE may have an Mw/Mn as determined by GPC of less than 10, preferably less than 8.

The LDPE is commercially available from ExxonMobil Chemical Company, Houston, Tex., and sold under ExxonMobil™ LDPE LD100BW, LD150BW, LD156BW, LD165BW, etc.

Metallocene Linear Low Density Polyethylenes (mLLDPE)

The metallocene LLDPE polymers are ethylene-based polymers having about 99.0 to about 80.0 wt %, 99.0 to 85.0 wt %, 99.0 to 87.5 wt %, 99.0 to 90.0 wt %, 99.0 to 92.5 wt %, 99.0 to 95.0 wt %, or 99.0 to 97.0 wt %, of polymer units derived from ethylene and about 1.0 to about 20.0 wt %, 1.0 to 15.0 wt %, 1.0 to 12.5 wt %, 1.0 to 10.0 wt %, 1.0 to 7.5 wt %, 1.0 to 5.0 wt %, or 1.0 to 3.0 wt % of polymer units derived from one or more $C_3$ to $C_{20}$ α-olefin comonomers, preferably $C_3$ to $C_{10}$ α-olefins, and more preferably $C_4$ to $C_8$ α-olefins. The α-olefin comonomer may be linear, branched, cyclic and/or substituted, and two or more comonomers may be used, if desired. Examples of suitable comonomers include propylene, butene, 1-pentene; 1-pentene with one or more methyl, ethyl, or propyl substituents; 1-hexene; 1-hexene with one or more methyl, ethyl, or propyl substituents; 1-heptene; 1-heptene with one or more methyl, ethyl, or propyl substituents; 1-octene; 1-octene with one or more methyl, ethyl, or propyl substituents; 1-nonene; 1-nonene with one or more methyl, ethyl, or propyl substituents; ethyl, methyl, or dimethyl-substituted 1-decene; 1-dodecene; and styrene. Particularly suitable comonomers include 1-butene, 1-hexene, and 1-octene, 1-hexene, and mixtures thereof.

In an embodiment of the invention, the metallocene LLDPE polymer comprises from about 8 wt % to about 15 wt %, of $C_3$-$C_{10}$ α-olefin derived units, and from about 92 wt % to about 85 wt % ethylene derived units, based upon the total weight of the polymer.

In another embodiment, the metallocene LLDPE polymer comprises from about 9 wt % to about 12 wt %, of $C_3$-$C_{10}$ α-olefin derived units, and from about 91 wt % to about 88 wt % ethylene derived units, based upon the total weight of the polymer.

The metallocene LLDPE polymers may have a melt index (MI), $I_{2.16}$ or simply 12 for shorthand according to ASTM D1238, condition E (190° C./2.16 kg) reported in grams per 10 minutes (g/10 min), of ≥about 0.10 g/10 min, e.g., ≥about 0.15 g/10 min, ≥about 0.18 g/10 min, ≥about 0.20 g/10 min, ≥about 0.22 g/10 min, ≥about 0.25 g/10 min, ≥about 0.28, or ≥about 0.30 g/10 min Additionally, the metallocene LLDPE polymers may have a melt index ($I_{2.16}$) ≤about 3.0 g/10 min, ≤about 2.0 g/10 min, ≤about 1.5 g/10 min, ≤about 1.0 g/10 min, ≤about 0.75 g/10 min, ≤about 0.50 g/10 min, ≤about 0.40 g/10 min, ≤about 0.30 g/10 min, ≤about 0.25 g/10 min, ≤about 0.22 g/10 min, ≤about 0.20 g/10 min, ≤about 0.18 g/10 min, or ≤about 0.15 g/10 min Ranges expressly disclosed include, but are not limited to, ranges formed by combinations any of the above-enumerated values, e.g., from about 0.1 to about 3.0, about 0.2 to about 2.0, about 0.2 to about 0.5 g/10 min, etc.

The metallocene LLDPE polymers may also have High Load Melt Index (HLMI), $I_{21.6}$ or $I_{21}$ for shorthand, measured in accordance with ASTM D-1238, condition F (190° C./21.6 kg). For a given polymer having an MI and MIR as defined herein, the HLMI is fixed and can be calculated in accordance with the following paragraph.

The metallocene LLDPE polymers may have a Melt Index Ratio (MIR) which is a dimensionless number and is the ratio of the high load melt index to the melt index, or $I_{2.16}/I_{2.16}$ as described above. The MIR of the metallocene LLDPE polymers may be from 25 to 80, alternatively, from 25 to 60, alternatively, from about 30 to about 55, and alternatively, from about 35 to about 50.

The metallocene LLDPE polymers may have a density ≥about 0.905 g/cm$^3$, ≥about 0.910 g/cm$^3$, ≥about 0.912 g/cm$^3$, ≥about 0.913 g/cm$^3$, ≥about 0.915 g/cm$^3$, ≥about 0.916 g/cm$^3$, ≥about 0.917 g/cm$^3$, ≥about 0.918 g/cm$^3$. Additionally or alternatively, metallocene LLDPE polymers may have a density ≤about 0.945 g/cm$^3$, e.g., ≤about 0.940 g/cm$^3$, ≤about 0.937 g/cm$^3$, ≤about 0.935 g/cm$^3$, ≤about 0.930 g/cm$^3$, ≤about 0.925 g/cm$^3$, ≤about 0.920 g/cm$^3$, or ≤about 0.918 g/cm$^3$. Ranges expressly disclosed include, but are not limited to, ranges formed by combinations any of the above-enumerated values, e.g., from about 0.905 to about 0.945 g/cm$^3$, 0.910 to about 0.935 g/cm$^3$, 0.912 to 0.930 g/cm$^3$, 0.916 to 0.925 g/cm$^3$, 0.918 to 0.920 g/cm$^3$, etc. Density is determined using chips cut from plaques compression molded in accordance with ASTM D-1928 Procedure C, aged in accordance with ASTM D-618 Procedure A, and measured as specified by ASTM D-1505.

Typically, although not necessarily, the metallocene LLDPE polymers may have a molecular weight distribution (MWD, defined as Man) of about 2.5 to about 5.5, preferably 3.0 to 4.0.

The melt strength may be in the range from about 1 to about 100 cN, about 1 to about 50 cN, about 1 to about 25 cN, about 3 to about 15 cN, about 4 to about 12 cN, or about 5 to about 10 cN.

The metallocene LLDPE polymers may also be characterized by an averaged 1% secant modulus (M) of from 10,000 to 60,000 psi (pounds per square inch), alternatively, from 20,000 to 40,000 psi, alternatively, from 20,000 to 35,000 psi, alternatively, from 25,000 to 35,000 psi, and alternatively, from 28,000 to 33,000 psi, and a relation between M and the dart drop impact strength in g/mil (DIS) complying with formula (A):

$$DIS \geq 0.8 * [100 + e^{(11.71 - 0.000268M + 2.183 \times 10^{-9}M^2)}], \quad (A)$$

where "e" represents 2.7183, the base Napierian logarithm, M is the averaged modulus in psi, and DIS is the 26 inch dart impact strength. The DIS is preferably from about 120 to about 1000 g/mil, even more preferably, from about 150 to about 800 g/mil.

The branching index, g' is inversely proportional to the amount of branching. Thus, lower values for g' indicate relatively higher amounts of branching. The amounts of short and long-chain branching each contribute to the branching index according to the formula:

$$g'=g'_{LCB} \times g'_{SCB}.$$

Typically, the metallocene LLDPE polymers have a g'vis of 0.85 to 0.99, particularly, 0.87 to 0.97, 0.89 to 0.97, 0.91 to 0.97, 0.93 to 0.95, or 0.97 to 0.99.

The metallocene LLDPE polymers may be made by any suitable polymerization method including solution polymerization, slurry polymerization, supercritical, and gas phase polymerization using supported or unsupported catalyst systems, such as a system incorporating a metallocene catalyst.

As used herein, the term "metallocene catalyst" is defined to comprise at least one transition metal compound containing one or more substituted or unsubstituted cyclopentadienyl moiety (Cp) (typically two Cp moieties) in combination with a Group 4, 5, or 6 transition metal, such as, zirconium, hafnium, and titanium.

Metallocene catalysts generally require activation with a suitable co-catalyst, or activator, in order to yield an "active metallocene catalyst", i.e., an organometallic complex with a vacant coordination site that can coordinate, insert, and polymerize olefins. Active catalyst systems generally include not only the metallocene complex, but also an activator, such as an alumoxane or a derivative thereof (preferably methyl alumoxane), an ionizing activator, a Lewis acid, or a combination thereof. Alkylalumoxanes (typically methyl alumoxane and modified methylalumoxanes) are particularly suitable as catalyst activators. The catalyst system may be supported on a carrier, typically an inorganic oxide or chloride or a resinous material such as, for example, polyethylene or silica.

Zirconium transition metal metallocene-type catalyst systems are particularly suitable. Non-limiting examples of metallocene catalysts and catalyst systems useful in practicing the present invention include those described in, U.S. Pat. Nos. 5,466,649, 6,476,171, 6,225,426, and 7,951,873, and in the references cited therein, all of which are fully incorporated herein by reference. Particularly useful catalyst systems include supported dimethylsilyl bis(tetrahydroindenyl) zirconium dichloride.

Supported polymerization catalyst may be deposited on, bonded to, contacted with, or incorporated within, adsorbed or absorbed in, or on, a support or carrier. In another embodiment, the metallocene is introduced onto a support by slurrying a presupported activator in oil, a hydrocarbon such as pentane, solvent, or non-solvent, then adding the metallocene as a solid while stirring. The metallocene may be finely divided solids. Although the metallocene is typically of very low solubility in the diluting medium, it is found to distribute onto the support and be active for polymerization. Very low solubilizing media such as mineral oil (e.g., Kaydo™ or Drakol™) or pentane may be used. The diluent can be filtered off and the remaining solid shows polymerization capability much as would be expected if the catalyst had been prepared by traditional methods such as contacting the catalyst with methylalumoxane in toluene, contacting with the support, followed by removal of the solvent. If the diluent is volatile, such as pentane, it may be removed under vacuum or by nitrogen purge to afford an active catalyst. The mixing time may be greater than 4 hours, but shorter times are suitable.

Typically in a gas phase polymerization process, a continuous cycle is employed where in one part of the cycle of a reactor, a cycling gas stream, otherwise known as a recycle stream or fluidizing medium, is heated in the reactor by the heat of polymerization. This heat is removed in another part of the cycle by a cooling system external to the reactor. (See e.g., U.S. Pat. Nos. 4,543,399; 4,588,790; 5,028,670; 5,317,036; 5,352,749; 5,405,922; 5,436,304; 5,453,471; 5,462,999; 5,616,661; and 5,668,228) To obtain the metallocene LLDPE polymers, individual flow rates of ethylene, comonomer, and hydrogen should be controlled and adjusted to obtain the desired polymer properties.

In some embodiments, the linear low density polyethylene is a copolymer comprising within a range from 0.5 to 20 wt % $C_4$ to $C_{12}$ α-olefin derived units by weight of the copolymer, the remainder of the copolymer comprising ethylene-derived units.

In some embodiments, the linear low density polyethylene has a peak melting point temperature ($T_m$) within a range from 90° C. to 130° C.

In some embodiments, the linear low density polyethylene has an $I_2$ (2.16 kg/190° C.) within a range from 0.2 g/10 min to 5 g/10 min.

In some embodiments, the linear low density polyethylene has one or more of the following properties: a melt index ($I_{2.16}$) of from 0.1 g/10 min to 2.0 g/10 min; a molecular weight of from 15,000 to 400,000 g/mol; a molecular weight distribution (Mw/Mn) of from 1.5 to 5.0; a hafnium concentration of greater than 5 ppm by weight; or a hafnium to zirconium ratio (ppm/ppm) ≥1.0.

Several commercial products produced with such catalyst/activator combinations are commercially available from ExxonMobil Chemical Company in Houston, Tex. under the tradename Exceed™ ethylene polymers, Exceed™ XP ethylene polymers, or Enable™ ethylene polymers.

Ziegler-Natta Linear Low Density Polyethylenes (Z-N LLDPE)

The Z-N LLDPE is generally heterogeneously branched ethylene polymers. The term "heterogeneously branched ethylene polymer" refers to a polymer having polymer units derived from ethylene and preferably at least one $C_3$-$C_{20}$ alpha-olefin. Typically, such polymers are the result of a Ziegler-Natta polymerization process.

Heterogeneously branched ethylene polymers differ from the homogeneously branched ethylene polymers primarily in their branching distribution. For example, heterogeneously branched LLDPE polymers have a distribution of branching, including a highly branched portion (similar to a very low density polyethylene), a medium branched portion (similar to a medium branched polyethylene) and an essentially linear portion (similar to linear homopolymer polyethylene). The amount of each of these fractions varies depending upon the whole polymer properties desired. For example, a linear homopolymer polyethylene polymer has neither branched nor highly branched fractions, but is linear.

The heterogeneously branched ethylene polymer typically comprises 80 to 100 mole % of polymer units derived from ethylene and 0 to 20.0 mole % of polymer units derived from at least one $C_3$ to $C_{20}$ alpha-olefin, preferably the alpha olefin has 4 to 8 carbon atoms. The content of comonomer is determined based on the mole fraction based on the content of all monomers in the polymer.

The content of polymer units derived from alpha-olefin in the heterogeneously branched ethylene polymer may be any amount consistent with the above ranges for ethylene. Some preferred amounts are 2.0 to 20.0 mole %, 2.0 to 15.0 mole %, or 5.0 to 10.0 mole %, particularly where the polymer units are derived from one or more $C_4$-$C_8$ alpha-olefins, more particularly butene-1, hexene-1, or octene-1.

Heterogeneously branched ethylene polymers may have a density ≤0.950 g/cm$^3$, preferably ≤0.940 g/cm$^3$, particularly from 0.915 to about 0.950 g/cm$^3$, preferably 0.920 to 0.940 g/cm$^3$.

The melt index, 1216, according to ASTM D-1238-E (190° C./2.16 kg) of the heterogeneously branched ethylene polymer is generally from about 0.1 g/10 min to about 100.0 g/10 min.

Suitable heterogeneously branched ethylene polymers include ExxonMobil™ Linear Low Density Polyethylene (LLDPE) available from ExxonMobil Chemical Company, Houston, Tex.

Additives

The polymer composition herein comprising COC and polyethylene may be used in combination with the following additives and other components.

First Antioxidant

The first antioxidant comprises one or more antioxidants. They include, but are not limited to, hindered phenols, for example, octadecyl-3-(3,5-di-tert.butyl-4-hydroxyphenyl)-propionate (CAS 002082-79-3) commercially available as IRGANOX™ 1076, pentaerythritol tetrakis (3-(3,5-di-tert-butyl-4-hydroxyphenyl)propionate) (CAS 6683-19-8) commercially available as IRGANOX™ 1010; and combinations thereof.

They may be combined with one or more polymers in range from 100 to 4000 parts by weight of the first antioxidant, based on one million parts of the polymer or polymer composition; alternatively, from 250 to 3000 parts by weight of the first antioxidant, based on one million parts of the polymer or polymer composition, alternatively, from 500 to 2500 parts by weight of the first antioxidant, based on one million parts of the polymer or polymer composition, alternatively, from 750 to 2500 parts by weight of the first antioxidant, based on one million parts of the polymer or polymer composition, alternatively, from 750 to 2000 parts by weight of the first antioxidant, based on one million parts of the polymer or polymer composition, and alternatively, from 1000 to 2000 parts by weight of the first antioxidant, based on one million parts of the polymer or polymer composition.

Second Antioxidant

The second antioxidant comprises one or more antioxidants. They include, but are not limited to, liquid phosphites, such as $C_2$-$C_7$, preferably $C_2$-$C_4$, and alkyl aryl phosphites mixed structures. Non-limiting examples include mono-amylphenyl phosphites, di-amylphenyl phosphites, dimethylpropyl phosphites, 2-methylbutanyl phosphites, and combinations thereof. In several embodiments of the invention, the second antioxidant may also be represented by the formula [4-(2-methylbutan-2-yl)phenyl]$_x$[2,4-bis(2-methylbutan-2-yl)phenyl]$_{3-x}$ phosphate, wherein x=0, 1, 2, 3, or combinations thereof.

Such antioxidants and their use with polyolefin polymers have been described in U.S. Patent Application Nos. 2005/0113494; 2007/0021537; 2009/0326112; 2013/0190434; 2013/225738; 2014/0045981, and U.S. Pat. Nos. 5,254,709; 6,444,836; 7,888,414; 7,947,769; 8,008,383; 8,048,946; 8,188,170; and 8,258,214. An example of a commercially available liquid phosphite is sold under the tradename WESTON™ 705 (Addivant, Danbury, Conn.).

The second antioxidant may be combined with one or more polymers in the range from 100 to 4000 parts by weight of the second antioxidant, based on one million parts of the polymer or polymer composition; alternatively, from 250 to 3000 parts by weight of the second antioxidant, based on one million parts of the polymer or polymer composition, alternatively, from 300 to 2000 parts by weight of the second antioxidant, based on one million parts of the polymer or polymer composition, alternatively, from 400 to 1450 parts by weight of the second antioxidant, based on one million parts of the polymer or polymer composition, alternatively, from 425 to 1650 parts by weight of the second antioxidant, based on one million parts of the polymer or polymer composition, and alternatively, from 1 to 450 parts by weight of the second antioxidant, based on one million parts of the polymer or polymer composition.

The polymers and/or compositions comprising the first antioxidant and/or the second antioxidant described above may be used in combination with the following neutralizing agents, additional additives and other components.

Neutralizing Agents

One or more neutralizing agents (also called catalyst deactivators) include, but are not limited to, calcium stearate, zinc stearate, calcium oxide, synthetic hydrotalcite, such as DHT4A, and combinations thereof.

Additional Additives and Other Components

Additional additives and other components include, but are limited to, fillers (especially, silica, glass fibers, talc, etc.) colorants or dyes, pigments, color enhancers, whitening agents, cavitation agents, anti-slip agents, lubricants, plasticizers, processing aids, antistatic agents, antifogging agents, nucleating agents, stabilizers, mold release agents, and other antioxidants (for example, hindered amines and phosphates). Nucleating agents include, for example, sodium benzoate and talc. Slip agents include, for example, oleamide and erucamide.

In a class of embodiments, the one or more layers or the films may comprise one or more of fillers, pigments, slip additives/agents, colorants or dyes, color enhancers, whitening agents, cavitation agents, lubricants, plasticizers, processing aids, antifogging agents, nucleating agents, stabilizers, mold release agents, or antioxidants.

Films and Method Making Thereof

The polymer compositions comprising polyethylene and COC described above may be formed into monolayer or multilayer films. As used herein a "film" or "multi-layered film" is a material that has an average thickness of less than or equal to 0.25 mm and may include one or more substances such as polymers, fillers, additives, oils, etc., and preferably is continuous within its measurable width and length, typically is flexible, and preferably has a thickness within a range from 2, or 10, or 20, or 40, or 45 μm to 50, or 100, or 150, or 200, or 250 μm.

It is contemplated that other materials can be incorporated into a film layer, or that a film layer itself may comprise or consist essentially of another material in any embodiment herein. Suitable materials include ethylene vinyl acetate, ethylene-based ionomers, polypropylene, propylene-based elastomers, ethylene-based plastomers, ethylene-propylene rubbers, styrenic block copolymers, styrenic polymers, cellulosic polymers, and combinations thereof.

Most preferably, the multi-layered films described herein have a thickness within a range from 30, or 40, or 45 μm to 50, or 55, or 60, or 100 μm. The term "film" also includes coatings, such as when the film is extruded onto a surface such as a metal, glass, another polymer, or other stiff or flexible surface. In any embodiment the multi-layered films described herein are so called shrink films. Desirably, the inventive multi-layered polyethylene films have a thickness less at least 5%, or 10%, or 15%, or 20%, or 30%, or 40%, or 50%, or 60%, or 70%, or 80%, or 90%, less than that of a polyethylene film free of the cyclic olefin copolymers but otherwise identical.

Preferably, the core layer of the films is sandwiched between two polyethylene skin layers. In a preferred embodiment, at least a core layer is sandwiched between two to six layers comprising LLDPE. Preferred configurations include a skin/core/skin, and skin/sub-skin/core/sub-skin/core configurations. In any embodiment, each skin layer independently comprises at least 50 wt % linear low density polyethylene by weight of each skin layer. In any embodiment, the multi-layered film further comprises a sub-skin layer sandwiched between a core layer(s) and each skin layer. Preferably, each sub-skin layer independently comprises at least 50 wt % linear low density polyethylene by weight of each skin layer. In the embodiments where there are two or more core layers, they are preferably adjacent to one another, but may have a layer of polyethylene such as LDPE or LLDPE therebetween.

In any embodiment, each polyethylene skin layer independently has a density within a range from 0.88, or 0.9, or 0.91 g/cm$^3$ to 0.925 g/cm$^3$.

Density can be determined according to ASTM D 1505-10. Compression molded samples for density measurements are made according to ASTM D4703-10a. Samples are conditioned by 40 hours conditioning of the density molded specimens (typically made from pellet samples) at 23° C. before density measurement.

In any embodiment, the polyethylene of the core layer is a linear low density polyethylene, a low density polyethylene, or a combination thereof. Preferably, the linear low density polyethylene is a copolymer comprising within a range from 0.5 to 10, or 20 wt % $C_4$ to $C_{12}$ α-olefin derived units by weight of the copolymer, the remainder of the copolymer comprising ethylene-derived units. Also, the linear low density polyethylene preferably has a peak melting point temperature ($T_m$) within a range from 90° C. to 130° C. Finally, the linear low density polyethylene preferably has an $I_2$ (2.16 kg/190° C.) within a range from 0.2 g/10 min to 3, or 4, or 5 g/10 min.

In any embodiment, the core layer further comprises within a range from 0.5 wt % to 20 wt % LDPE. Also, in any embodiment, each skin layer further independently comprises within a range from 0.5 wt % to 20 wt % LDPE.

The multi-layered films described herein have a number of unique properties. In any embodiment, the multi-layered films have a TD shrink of at least 18, or 20%, or within a range from 18, or 20% to 28, or 30, or 36%, or 40%. In any embodiment, the multi-layered films have a TD shrinking force of at least 5 or 10 mN, or within a range from 5 or 10 mN to 20, or 24, or 28, or 32, or 36, or 40 or 44 or 48 or 50 mN. In any embodiment, the multi-layered films have an MD shrink within a range from 35 to 90%. In any embodiment, the multi-layered films have an MD shrinking force within a range from 20 to 100 mN. In any embodiment, the multi-layered films have a 1% TD secant flexural modulus of at least 200 MPa, or within a range from 200, 220 MPa to 460, or 480, or 500, or 520 MPa. In any embodiment, the multi-layered films have a 1% MD secant flexural modulus of at least 200 MPa, or within a range from 200, 220 MPa to 660, or 680, or 700 MPa. In any embodiment, the multi-layered films have a plateau seal strength of at least 14, or 15 N, or within a range from 14, or 15 N to 20, or 22 or 24 or 28 or 32 or 36 N.

Also, in any embodiment, the multi-layered films have an MD or TD tensile strength of at least 20, or 25, or 30, or 35 MPa, or within a range from 20, or 25, or 30, or 35 MPa to 50, or 55, or 60, or 65 MPa.

In any embodiment, the multi-layered films have a haze value of less than 20, or 15, or 10%.

In any embodiment, the multi-layered films have a dart drop within a range from 2, or 4 g/μm to 10, or 14, or 18, or 22, or 26, or 30 g/μm.

A preferred process to form the multi-layered films is in a blown film process. In a typical blown film process, a polyethylene melt is extruded through a die such as an annular slit die, usually vertically, to form a thin walled tube. Preferably, the die used in the formation of the films herein is designed such that the die opening, through which the molten polyethylene emanates, is in the form of a ring and the molten polyethylene emanating therefrom is in the form of a continuous tube. Cooling, preferably in the form of air, is introduced via a ring in the center of the die to blow up the tube like a balloon. Cooling could also be effectuated by other means, and the air may be nitrogen/oxygen or other gases or mixtures of gases or liquids. Mounted on top of the die, a high-speed air ring blows onto the hot film to cool it. The tube of film can then continue upwards away from the die, continually cooling, until it may pass through nip rolls where the tube is flattened to create what is known as a "lay-flat" tube of film. This lay-flat or collapsed tube can then be taken back down the extrusion "tower" via more rollers. In any embodiment, the air inside the bubble is also exchanged, known as "Internal Bubble Cooling" (IBC).

In any case, the lay-flat film is then either kept as such or the edges of the lay-flat are slit off to produce two flat film sheets and wound up onto reels. Articles, such as bags, can be made from such lay-flat films. In this regard, if kept as lay-flat, the tube of film is made into bags by sealing across the width of film and cutting or perforating to make each bag. This is done either in line with the blown film process or at a later stage.

Preferably, the expansion ratio between die and blown tube of film would be 1.1, or 1.2 to 2, or 3, or 4 times the die diameter. The drawdown between the melt wall thickness and the cooled film thickness occurs in both radial and longitudinal directions and is easily controlled by changing the volume of air inside the bubble and by altering the haul off speed. This gives blown film a better balance of properties than traditional cast or extruded film which is drawn down along the extrusion direction only.

A typical blown film process can be used where the ingredients used to form the film are added in any desirable form, preferably as granules to a hopper, which feeds the material to the extruder, where the materials are melt blended at a desirable temperature through shear forces and/or heating. Common "additives," such as antioxidants, may be added either as a solid to the hopper, or in the form of a masterbatch, wherein the one or more additives is incorporated into a polymeric or waxy pellet. The molten material is then fed, with or without filtering, to a die which is also heated to a desired temperature and then forced from the die. The cooling of the forming film takes place preferably via a device that blows air that is at least 10 or 20° C. cooler than the surrounding air. The air preferably blows against the outside of the film, most preferably around the entire circumference formed by the film. There is also air blown internally that both cools and blows the film up like a balloon. The film starts to expand where it eventually cools and crystallizes to form finished film. The air blowing device can be adjusted up or down, away from the die, to allow the molten, heated tube of polymer to crystalize on its own (under room temperature such as 20° C.) before being cooled further.

The multi-layered films have certain processing advantages. In any embodiment, the at least one core layer of the multi-layered films extrudes at a melt temperature at the die (measured using a thermocouple in the melt) of 238, or 240° C. or less, or within a range from 210, or 215, or 220, or 225, or 230° C. to 238, or 240, or 245, or 250° C. In any embodiment, the at least one core layer of the multi-layered films extrudes at a melt pressure of 45, or 42 MPa or less, or within a range from 30, or 35, or 38 MPa to 42, or 45, or 50 MPa. These melt temperatures and melt pressures are preferably obtained with a die factor within a range from 0.6 to 1 kg/mm die φ, and/or a specific output within a range from 2.8 to 3.2 kg/h/rev. The die factor is expressed in kg/mm-hr, the full expression is kg/die diameter (in unit of mm)/hr.

The various descriptive elements and numerical ranges disclosed herein for the inventive multi-layered structures and methods of forming such can be combined with other descriptive elements and numerical ranges to describe the invention(s); further, for a given element, any upper numerical limit can be combined with any lower numerical limit described herein, including the examples in jurisdictions that allow such combinations. The features of the inventions are demonstrated in the following non-limiting examples.

Test Methods

The properties cited below were determined in accordance with the following test procedures. Where any one of these properties is referenced in the appended claims, it is to be measured in accordance with the following, specified test procedure.

Density is measured by density-gradient column, as described in ASTM D1505, on a compression-molded specimen that has been slowly cooled to room temperature (i.e., over a period of 10 minutes or more) and allowed to age for a sufficient time that the density is constant within +/−0.001 g/cm$^3$. The units for density are g/cm$^3$.

Melt Index (MI, also referred to as 12.16) is measured according to ASTM D-1238 at 190° C., under a load of 2.16 kg unless otherwise noted. The units for MI are g/10 min or dg/min High Load Melt Index (HLMI, also referred to as 121.6) is the melt flow rate measured according to ASTM D-1238 at 190° C., under a load of 21.6 kg. The units for HLMI are g/10 min or dg/min.

Melt Index Ratio (MIR) is the ratio of the high load melt index to the melt index, or $I_{2.16}/I_{2.16}$.

Glass Transition Temperature ($T_g$) and Melting Point Temperature ($T_m$) referred to herein can be determined using Differential Scanning calorimeter (DSC) methods. In particular, approximately 6 mg of material is placed in a microliter aluminum sample pan. An example of a suitable differential scanning calorimeter is a Perkin Elmer or TA Instrument Thermal Analysis System. The sample is then heated from 23° C. to 220° C. at 10° C./minute and held at 220° C. for 5 minutes. Afterward, the sample is cooled down to −20° C. at 10° C./minute. The sample is held at −20° C. for 5 minutes and then heated from −20° C. to 220° C. at 10° C./minute for a second heating cycle. The $T_m$ and $T_g$ is determined on the second heating cycle. The $T_m$ is the peak heat flow (zero inflection). For $T_g$, the "Glass Transition" menu item on the TA Universal Analysis equipment can be used to calculate the onset, end, inflection, and signal change of $T_g$ in the DSC. The program enables the determination of the onset, which is the intersection of the first and second tangents, where the inflection is the portion of the curve between the first and third tangents with the steepest slope, and the end is the intersection of the second and third tangents.

Film property test methods used are summarized as follows.

| Test | Method or description |
|---|---|
| Melt index ($I_2$) | ASTM D-1238, 2.16 kg, 190° C. |
| 1% secant flexural modulus | ASTM D-882, 15 mm width strip |
| Tensile Strength at Break | ASTM D-882, 15 mm width strip |
| Elongation at Break | ASTM D-882, 15 mm width strip |
| Dart Drop | ASTM D-1709 |
| Haze | ASTM D-1003 |
| Gloss, 45° C. | ASTM D-2457 |
| Plateau Seal Strength | ASTM F-88 |
| Peak Hot Tack Force | ASTM F-1921 |
| Shrinking Force | ISO 14616 |
| Contracting Force | ISO 14616 |
| Shrinkage Speed | ISO 14616 |
| Holding Force | ISO 14616 |
| Puncture | ASTM D-5748 |
| Elmendorf Tear | ASTM D-1922 |

Shrink (Betex shrink), reported as a percentage, was measured by cutting circular specimens from a film using a 50 mm die. The samples were then put on a copper foil and embedded in a layer of silicon oil. This assembly was heated by putting it on a 150° C. hot plate (model Betex) until the dimensional change ceased. An average of four specimens is reported. A negative shrinkage number indicates expansion of a dimension after heating when compared to its preheating dimension.

EXAMPLES

It is to be understood that while the invention has been described in conjunction with the specific embodiments thereof, the foregoing description is intended to illustrate and not limit the scope of the invention. Other aspects, advantages and modifications will be apparent to those skilled in the art to which the invention pertains.

Therefore, the following examples are put forth so as to provide those skilled in the art with a complete disclosure and description and are not intended to limit the scope of that which the inventors regard as their invention.

Materials used in the example films herein include five grades of Enable™ 2703 HH, Enable™ 2705HH, Exceed™ 1012 MK, Exceed™ XP 6026, and Exceed™ XP 8656 LLDPEs from ExxonMobil. Also used is one grade of high pressure reactor-produced low density polyethylenes (LD) from ExxonMobil: LD 165 BW ($I_2$ of 0.33 g/10 min, density 0.922 g/cm$^3$). Finally, a representative grade of Topas™ cyclic-olefin copolymers (COC) from Topas Advanced Polymers Inc. is used as summarized in Table 1.

TABLE 1

Representative COC Grade Used in the Film Production

| Grade | Density (g/cc) | Norbornene Content (wt %) | Melt Index Equivalent (g/10 min) (190° C./2.16Kg) | Glass Transition Temperature* (° C.) |
|---|---|---|---|---|
| Topas™ 5013F-04 (COC) | 1.020 | 78 | <0.1 | 134 |

*As reported by Topas Advanced Polymers, Inc. by DSC per ISO 11357-1, -2, -3, at a heating rate of 10° C./minute.

Example 1

A first set of experiments were conducted at using a Hosokawa Alpine mono blown film line. The extruder used for a monolayer production had 11 sections kept at a set temperature of about 240° C. The feed zone is the starting zone of the extruder at the hopper where resins are added to the extruder, followed by 4 zones where the resins are heated, blended, and transferred. Finally, the melt will go through die to form film. The 10 die head zone is the heating areas to control the temperature of die head. Setting condition of the blown film line is as follows: extruder temperature was 180° C. for Zone 1, and 220° C. for Zone 2-11; die temperature was 240° C.; die diameter was 160 mm; die gap was 1.5 mm; output was 110 kg/h; frost line height was 600 mm; thickness was 100 μm; and bubble blow-up ratio (BUR) was 3.0. The film design is shown in Table 2. The average monolayer film thickness is 100 μm, with the monolayer containing 100 wt % Enable™ 2703HH LLDPE (1-1), 90 wt % Enable™ 2703HH LLDPE and 10 wt % COC (1-2), Enable™ 2705HH LLDPE (1-3), or 95 wt % Enable™ 2705HH LLDPE and 5 wt % COC (1-4), where the films of 1-1 and 1-3 are control examples without COC.

TABLE 2

Film Design for First Set of Experiments

| Number | Monolayer |
|---|---|
| 1-1 | 100 wt % Enable 2703HH |
| 1-2 | 90 wt % Enable 2703HH + 10 wt % TOPAS 5013F-04 |
| 1-3 | 100 wt % Enable 2705HH |
| 1-4 | 95 wt % Enable 2705HH + 5 wt % TOPAS 5013F-04 |

The films 1-2 and 1-4 with COC can be processed at milder or similar conditions to the control films 1-1 and 1-3. Film properties are shown in Table 4. The property results indicate that the addition of COC in LLDPE film significantly improve stiffness in both of MD and TD, while slightly improve the dart impact. The MD and TD creep of COC/LLDPE blending film are much lower than neat LLDPE film, which means COC could improve film creep resistance. With adding COC in LLDPE film, the MD tear improves with decreasing of TD tear, which bring a better MD/TD tear balance to benefit the east-opening packaging, while the tensile strength maintains with the addition of COC. All these properties results demonstrate that LLDPE film properties on toughness, stiffness, creep and tear resistance can be improved through blending with COC.

Figure 1:
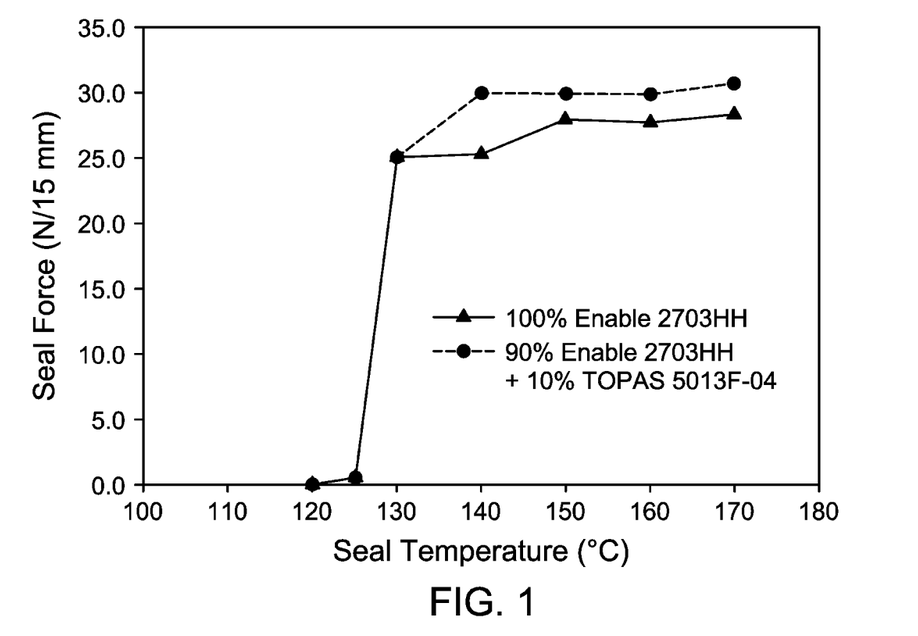
FIG. 1 is a plot of seal strength as a function of seal temperatures for 90% Enable™ 2703HH/10% TOPAS 5013F-04 blending film.
Figure 2:
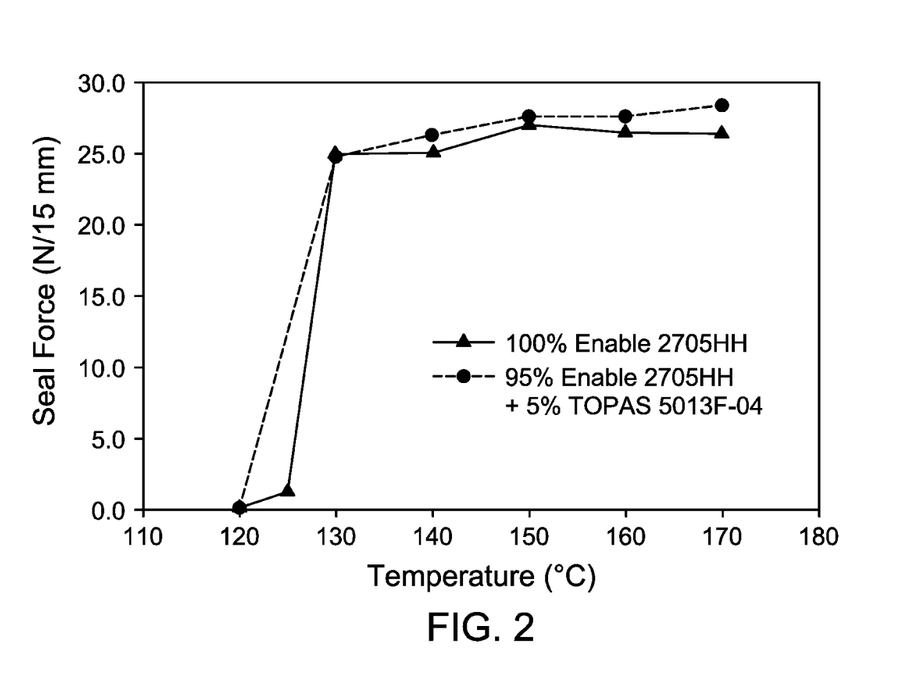
FIG. 2 is a plot of seal strength as a function of seal temperatures for 95% Enable™ 2705HH/5% TOPAS 5013F-04 blending film.

Seal strength results of the inventive films is shown in FIG. 1. It can be seen that the plateau sealing strength improves up to 20% with no obvious change on sealing initiating temperature. The seal strength is critical for food or non-food packaging application.

Example 2

Figure 3:
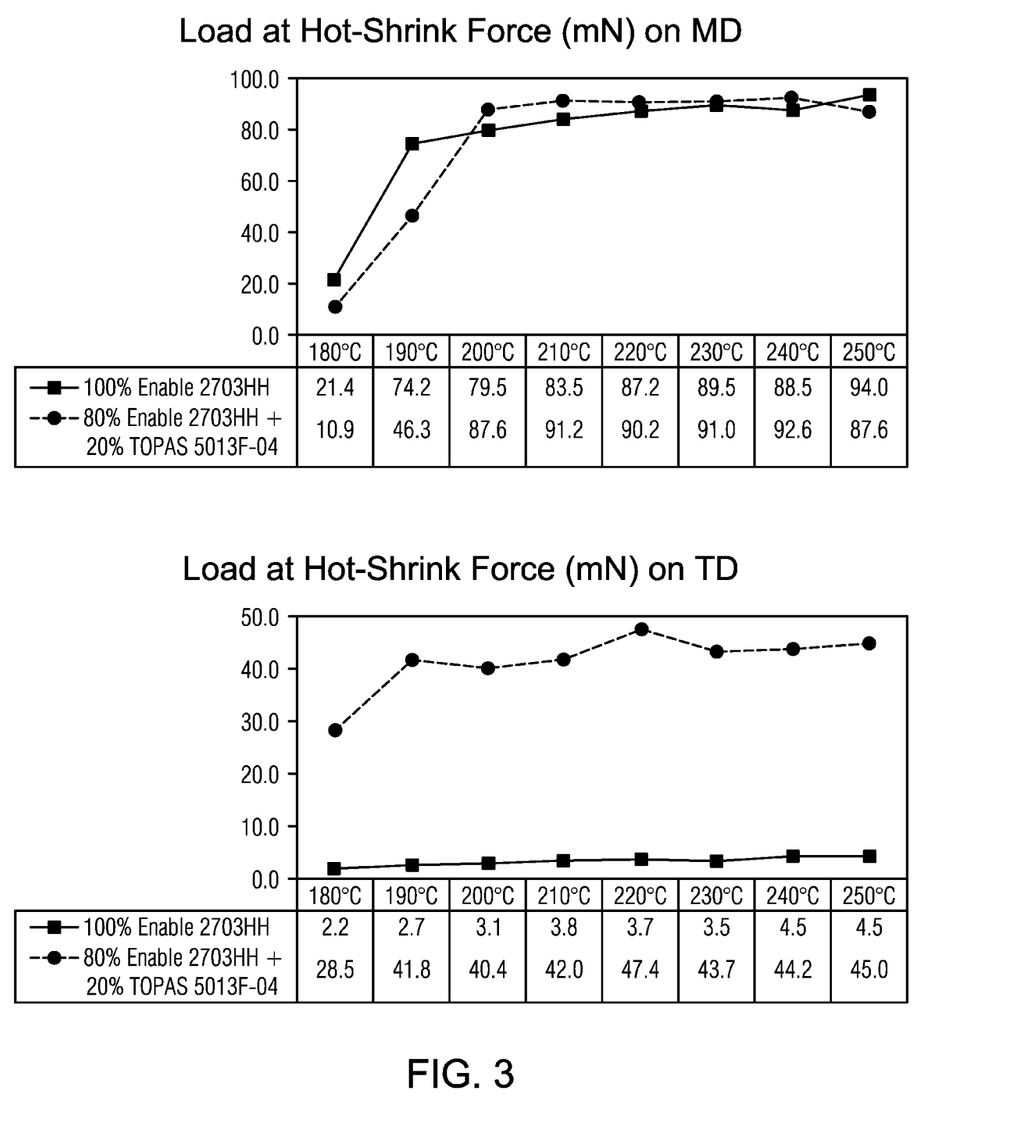
FIG. 3 is loads at different testing temperatures of monolayer film including Enable™ 2703HH/TOPAS 5013 F-04.

A second set of experiments were conducted at using a Hosokawa Alpine mono blown film line. The extruder used for a monolayer production had 11 sections kept at a set temperature of about 240° C. The feed zone is the starting zone of the extruder at the hopper where resins are added to the extruder, followed by 4 zones where the resins are heated, blended, and transferred. Finally, the melt will go through the die to form film. The 10 die head zone is the heating areas to control the temperature of die head. Setting condition of the blown film line is as follows: extruder temperature was 180° C. for Zone 1, and 220° C. for Zone 2-11; die temperature was 240° C.; die diameter was 160 mm; die gap was 1.5 mm; output was 110 kg/h; frost line height was 550 mm; thickness was 50 μm; and bubble blow-up ratio (BUR) was 3.0. The average monolayer film thickness is 50 μm, with the monolayer containing 80 wt % Enable™ 2703HH LLDPE and 20 wt % COC, or Enable™ 2703HH LLDPE (a control film without COC). According to FIG. 3, both neat Enable™ 2703HH monolayer film and Enable™ 2703HH/TOPAS™ 5013 F-04 monolayer film have good MD loading force at hot temperature. With the addition of COC, the blending film could also reach the plateau of shrink force without much higher operating temperature. It indicates that COC/LLDPE blending film could be run at similar packaging line same as normal PE film (using, for instance, LDPE conditions). For TD shrink force as shown in FIG. 1, the neat Enable™ 2703HH film could not provide apparent shrink force at different temperatures. In contrast, the blending film demonstrates substantial increase of TD shrink force at relatively low temperatures. It indicates that COC/LLDPE blending film has more balanced MD/TD shrink force compared with neat PE film, which will be a benefit to produce a good quality of "bull eye" and increase packaging line speed.

Figure 4:
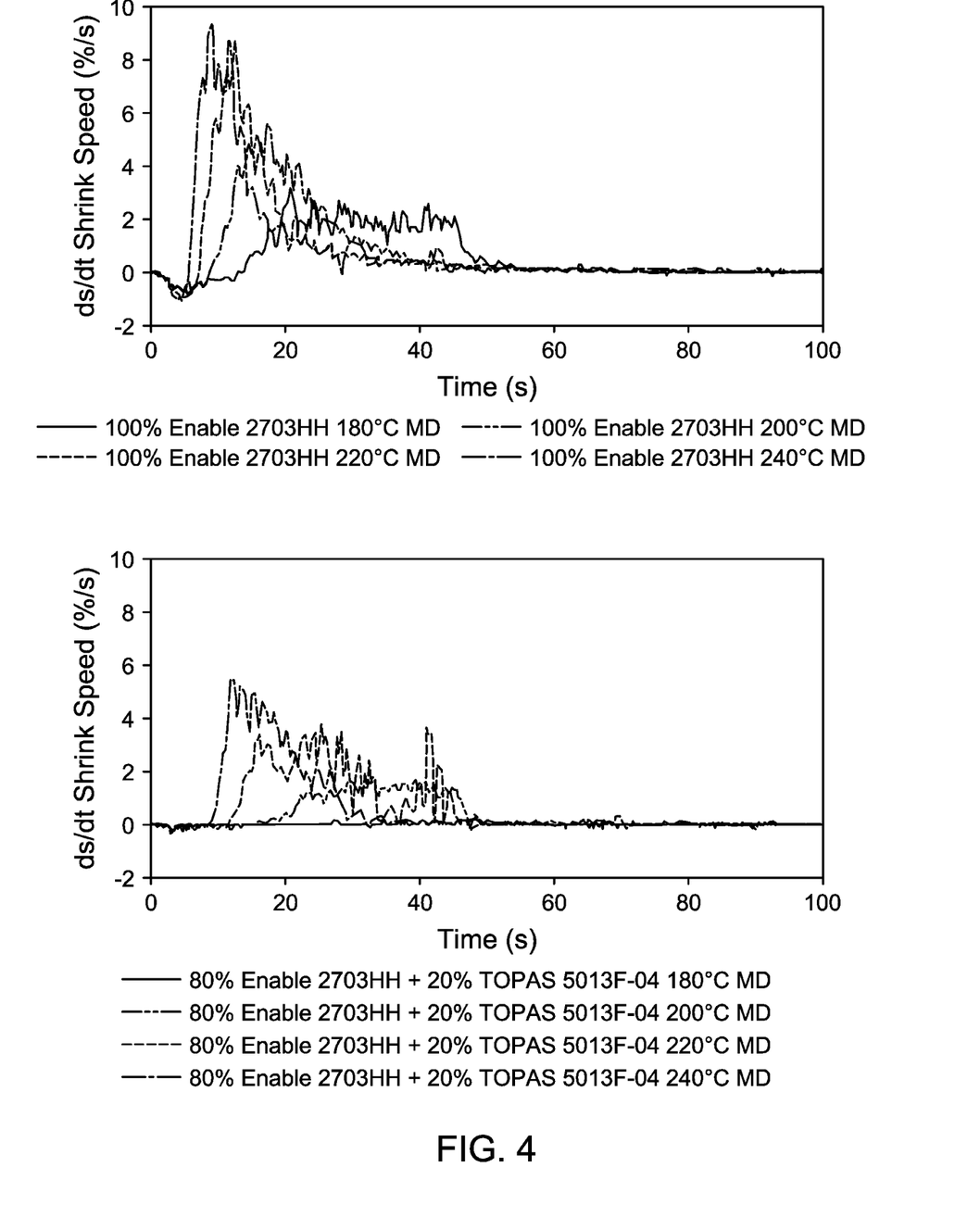
FIG. 4 is MD shrink speeds at different testing temperatures of monolayer film including Enable™ 2703HH/TOPAS 5013F-04.
Figure 5:
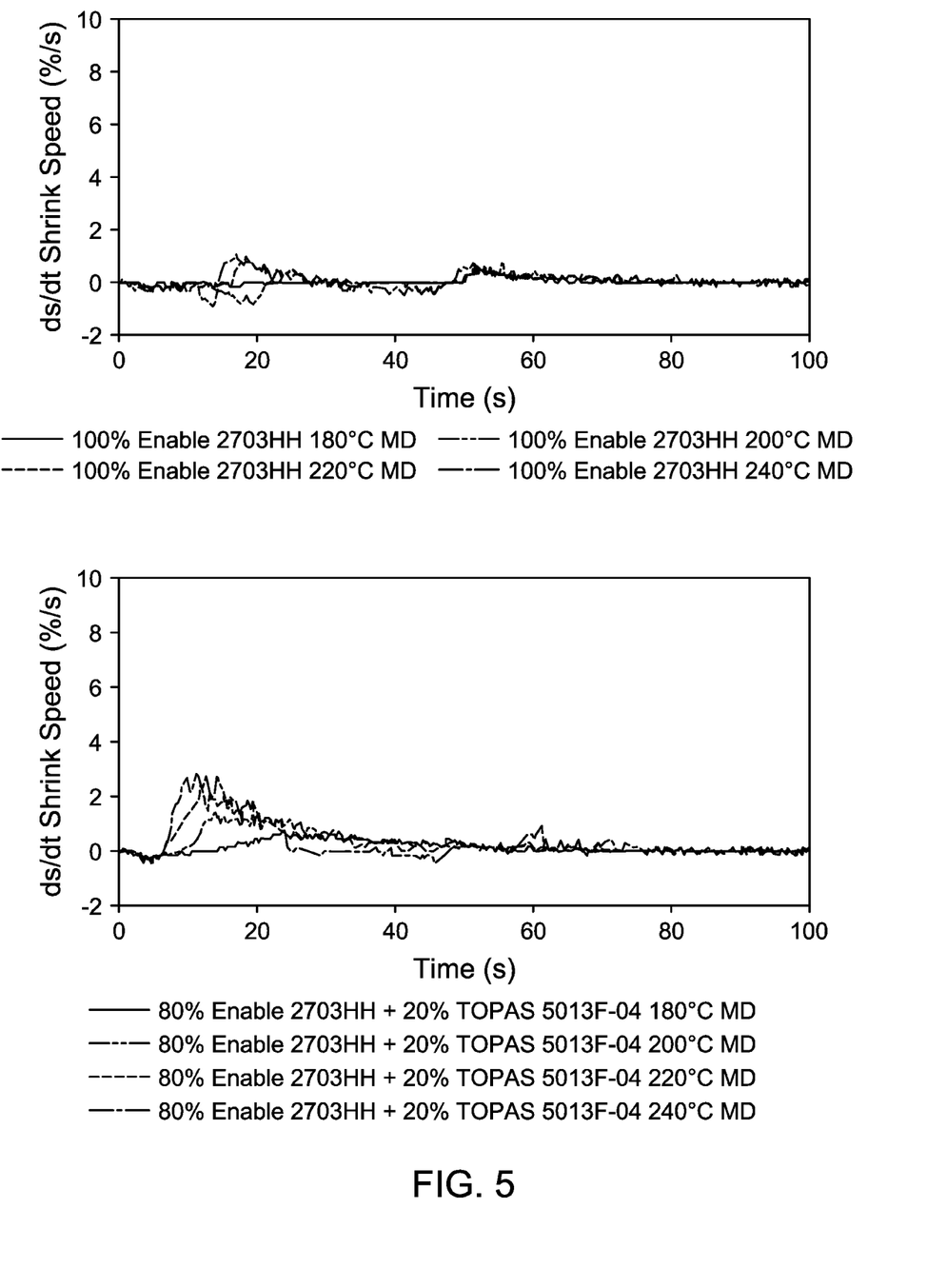
FIG. 5 is TD shrink speeds at different testing temperatures of monolayer film including Enable™ 2703HH/TOPAS 5013F-04.

As shown in FIG. 4, both the films have good MD shrink speed as the function of testing temperature. Addition of COC does not sacrifice the shrink speed in MD. As shown in FIG. 5, the addition of COC could improve TD shrink speed significantly, compared with inconspicuous shrink speed peak in neat Enable™ film. Overall, the COC/LLDPE blend film display much better MD/TD shrink speed at typical operating temperatures, which is beneficial for producing high-quality "bull eye" in industrial packaging line.

TABLE 3

Film Properties of First Set of Experiments

| Film Property | MD Creep % | TD Creep % | Seal Strength @ 140° C. N/15 mm | MD Stiffness MPa | TD Stiffness MPa | MD Tensile Strength MPa | TD Tensile Strength MPa | Dart g/μm | MD Tear g/μm | TD Tear g/μm | MD/TD Tear Balance Ratio |
|---|---|---|---|---|---|---|---|---|---|---|---|
| 1-1 | 62.3 | 252.3 | 25.3 | 371 | 405 | 53.7 | 51.2 | 6.0 | 3.7 | 17.3 | 0.21 |
| 1-2 | 15 | 31.7 | 30 | 607 | 508 | 49.0 | 47.2 | 6.2 | 5.7 | 8.6 | 0.66 |
| 1-3 | 72.3 | 330.3 | 25.1 | 371 | 456 | 50 | 48.1 | 5.1 | 3.7 | 17.8 | 0.21 |
| 1-4 | 58.7 | 65.7 | 26.3 | 435 | 426 | 46.2 | 43.2 | 5.6 | 7.1 | 15.5 | 0.67 |

Example 3

A third set of experiments were conducted at using a Hosokawa Alpine mono blown film line. The extruder used for monolayer production had 11 sections kept at a set temperature of about 240° C. The feed zone is the starting zone of the extruder at the hopper where resins are added to the extruder, followed by 4 zones where the resins are heated, blended, and transferred. Finally, the melt will go through die to form film. The 10 die head zone is the heating areas to control the temperature of die head. Setting condition of the blown film line is as follows: extruder temperature was 180° C. for Zone 1, and 220° C. for Zone 2-11; die temperature was 240° C.; die diameter was 160 mm; die gap was 1.5 mm; output was 110 kg/h; frost line height was 550 mm; thickness was 50 µm; and bubble blow-up ratio (BUR) was 3.0. The film design is shown in Table 4. The average film thickness is 50 µm, with the monolayer containing 100 wt % Enable™ 2703HH LLDPE (3-1), 90 wt % Enable™ 2703HH LLDPE and 10 wt % COC (3-2), 80 wt % Enable™ 2703HH LLDPE and 20 wt % COC (3-3), 100 wt % Exceed™ XP 6026 LLDPE (3-4), 90 wt % Exceed™ XP 6026 LLDPE and 10 wt % COC (3-5), or 80 wt % Exceed™ XP 6026 LLDPE and 20 wt % COC (3-6). Film properties are shown in Table 5.

TABLE 4

Film Design for Third Set of Experiments

| Number | Monolayer |
|---|---|
| 3-1 | 100 wt % Enable 2703HH |
| 3-2 | 90 wt % Enable 2703HH + 10 wt % TOPAS 5013F-04 |
| 3-3 | 80 wt % Enable 2703HH + 20 wt % TOPAS 5013F-04 |
| 3-4 | 100 wt % Exceed ™ XP 6026 |
| 3-5 | 90 wt % Exceed ™ XP 6026 + 10 wt % TOPAS 5013F-04 |
| 3-6 | 80 wt % Exceed ™ XP 6026 + 20 wt % TOPAS 5013F-04 |

TABLE 5

Film Properties of Third Set of Experiments

| Film Property | MD Shrink % | TD Shrink % | MD/TD Shrink Balance | MD Shrink Force mN | TD Shrink Force mN | MD Holding Force mN | TD Holding Force mN |
|---|---|---|---|---|---|---|---|
| 3-1 | 74.2 | 22.2 | 3.34 | 28.8 | 3.0 | 822.6 | 885.8 |
| 3-2 | 46.2 | 25.2 | 1.57 | 48.0 | 5.2 | 1405.1 | 1813.8 |
| 3-3 | 43.5 | 31.8 | 1.37 | 90.3 | 40.1 | 1466.8 | 1719.4 |
| 3-4 | 75.8 | 27.5 | 2.76 | 53.2 | 6.5 | 679.3 | 588.7 |
| 3-5 | 50.0 | 32.3 | 1.55 | 57.6 | 19.4 | 866.4 | 1205.1 |
| 3-6 | 44.7 | 34.0 | 1.18 | 94.8 | 48.58 | 1469.0 | 1238.1 |

As shown in Table 5, the addition of COC in both of Enable 2703HH and Exceed XP 6026 could significantly improve the TD shrink ratio, meanwhile decrease MD shrink ratio, which bring a better MD/TD shrink balance to be benefit for shrink film application. Moreover, the MD and TD shrink force and MD and TD holding force also significantly improve with adding COC into both LLDPE grades, which is benefit to the shrink packaging application as well. Typically, good MD/TD shrink balance will give the better shape of "bull eye" for collation shrink packaging, the good shrink force is related to film shrink speed, which has potential to increase the line speed of shrink tunnel, the higher holding force will give a better fastening force for bottle. Therefore, the addition of COC enhances shrink properties of LLDPE films.

Example 4

A fourth set of experiments were conducted at using Jinming 3-layer blown film line. The extruder used for 3-layer films had 6 sections kept at a set temperature of about 200° C. The feed zone is the starting zone of the extruder at the hopper where resins are added to the extruder, followed by 5 zones where the resins are heated, blended, and transferred. Finally, the melt will go through die to form film. The 6 die head zone is the heating areas to control the temperature of die head. Setting condition of the blown film line is as follows: extruder temperature was 175° C. for Zone 1, and 200° C. for Zone 2-5; die temperature was 200° C.; die diameter was 250 mm; die gap was 1.5 mm; output was 130 kg/h; thickness was 20 µm; and bubble blow-up ratio (BUR) was 3.4. The film design (1/4/1) is shown in Table 6. The average multilayered film thickness is 20 µm. Film properties are shown in Table 7.

TABLE 6

Film Design for Fourth Set of Experiments

| Number | Control Sample 4-1 | Inventive Sample 4-2 |
|---|---|---|
| Skin | 100% Exceed 1012MK | 100% Exceed 1012MK |
| Core | 80% Exceed XP 6026 20% LD 165BW1 | 80% Exceed XP 6026 20% TOPAS 5013 (13% of COC in total) |

TABLE 7

Film Properties of Fourth Set of Experiments

| Film Property | | 4-1 | 4-2 |
|---|---|---|---|
| MD Shrink | % | 88.5 | 67 |
| TD Shrink | % | 16.5 | 40.7 |
| MD Shrink Force | mN | 373.59 | 87.55 |
| TD Shrink Force | mN | 2.84 | 24.58 |
| MD Holding Force | mN | 273.684 | 850.007 |
| TD Holding Force | mN | 179.249 | 621.345 |
| MD Stiffness | MPa | 138 | 530 |
| TD Stiffness | MPa | 119 | 327 |
| MD Tensile Strength | MPa | 61.5 | 35.8 |
| TD Tensile Strength | MPa | 28.4 | 40.7 |
| Dart | g/µm | 12.1 | 15.5 |
| Puncture | J | 1.67 | 1.65 |
| Haze | % | 4.7 | 12.6 |

As shown in Table 7, replacing LDPE with COC in LLDPE film significantly boosts the shrink in both TD and MD. Meanwhile, the TD shrink force is improved from 2.84% to 24.58% with such replacement. The improvement is helpful for soft shrink film application made by a single bubble blown film line. The dart impact is also improved while puncture resistance and tensile strength are maintained when replacing LDPE with COC in LLDPE film. This gives an opportunity to fine tune-able and reach high shrink ratio of MD/TD, without sacrificing other properties. In addition, the COC/LLDPE blending film shows an opportunity to fine tune-able suitable stiffness and holding force in MD/TD for matching specific soft shrink film application in different areas.

Example 5

A fifth set of experiments were conducted at using an Alpine blown film line. The extruder used for a monolayer had 11 sections kept at a set temperature of about 240° C. The feed zone is the starting zone of the extruder at the hopper where resins are added to the extruder, followed by 4 zones where the resins are heated, blended, and transferred. Finally, the melt will go through die to form film. The 10 die head zone is the heating areas to control the temperature of die head. Setting condition of the blown film line is as follows: extruder temperature was 180° C. for Zone 1, and 220° C. for Zone 2-11; die temperature was 240° C.; die diameter was 160 mm; die gap was 1.5 mm; output was 110 kg/h; frost line height was 550 mm; thickness was 50 μm; and bubble blow-up ratio (BUR) was 3.0. The film design is shown in Table 2. The average film thickness is 50 μm. Film properties are shown in Table 9.

TABLE 8

Film Design for Fifth Set of Experiments

| Number | Monolayer |
|---|---|
| 5-1 | 100 wt % Exceed XP 6026 |
| 5-2 | 95 wt % Exceed XP 6026 + 5 wt % TOPAS 5013F-04 |
| 5-3 | 90 wt % Exceed XP 6026 + 10 wt % TOPAS 5013F-04 |
| 5-4 | 85 wt % Exceed XP 6026 + 15 wt % TOPAS 5013F-04 |
| 5-5 | 80 wt % Exceed XP 6026 + 20 wt % TOPAS 5013F-04 |

TABLE 9

Film Properties of Fifth Set of Experiments

| Film Property | MD Stiffness MPa | TD Stiffness MPa | MD Tensile Strength MPa | TD Tensile Strength MPa | MD Tear g/um | TD Tear g/um | MD/TD Tear Balance Ratio | Dart g/um | Puncture J |
|---|---|---|---|---|---|---|---|---|---|
| 5-1 | 181 | 187 | 68.7 | 67.2 | 4.1 | 14 | 0.29 | 29.5 | 3.88 |
| 5-2 | 231 | 227 | 69.1 | 65.7 | 4.2 | 10.5 | 0.40 | 29.5 | 3.48 |
| 5-3 | 399 | 287 | 60.5 | 65.8 | 4.7 | 6.4 | 0.73 | 24.2 | 3.16 |
| 5-4 | 518 | 305 | 56.3 | 64.0 | 4.9 | 5.3 | 0.92 | 23.0 | 2.73 |
| 5-5 | 695 | 522 | 50.9 | 64.6 | 5.0 | 4.5 | 1.11 | 18.5 | 2.44 |

As shown in Table 9, the addition of COC in Exceed™ XP 6026 could improve stiffness in both MD and TD. And the tensile strength of MD and TD have no obvious changes with adding COC into LLDPE. For tear resistance, MD tear increases and TD tear decreases, which brings a good MD/TD tear balance. This is a good potential to reach easy opening packaging. For toughness properties, addition of certain amount of COC has acceptable influence on dart and puncture, which still fit for the requirement of applications.

Example 6

A sixth set of experiments were conducted at using an Alpine blown film line. The extruder used for a monolayer had 11 sections kept at a set temperature of about 240° C. The feed zone is the starting zone of the extruder at the hopper where resins are added to the extruder, followed by 4 zones where the resins are heated, blended, and transferred. Finally, the melt will go through die to form film. The 10 die head zone is the heating areas to control the temperature of die head. Setting condition of the blown film line is as follows: extruder temperature was 180° C. for Zone 1, and 220° C. for Zone 2-11; die temperature was 240° C.; die diameter was 160 mm; die gap was 1.5 mm; output was 110 kg/h; frost line height was 550 mm; thickness was 50 μm; and bubble blow-up ratio (BUR) was 2.0. The film design is shown in Table 10. The average film thickness is 50 μm. Film properties are shown in Table 11.

TABLE 10

Film Design for Sixth Set of Experiments

| Number | Monolayer |
|---|---|
| 6-1 | 100 wt % Exceed XP 8656 |
| 6-2 | 95 wt % Exceed XP 8656 + 5 wt % TOPAS 5013F-04 |
| 6-3 | 90 wt % Exceed XP 8656 + 10 wt % TOPAS 5013F-04 |
| 6-4 | 85 wt % Exceed XP 8656 + 15 wt % TOPAS 5013F-04 |
| 6-5 | 80 wt % Exceed XP 8656 + 20 wt % TOPAS 5013F-04 |

TABLE 11

Film Properties of Sixth Set of Experiments

| Film Property | | 6-1 | 6-2 | 6-3 | 6-4 | 6-5 |
|---|---|---|---|---|---|---|
| MD Stiffness | MPa | 209 | 261 | N/A | 631 | 751 |
| TD Stiffness | MPa | 282 | 307 | N/A | 419 | 492 |
| MD Tensile Strength | MPa | 67.3 | 67.2 | 60.4 | 46.7 | 47.2 |
| TD Tensile Strength | MPa | 58 | 59.8 | 62 | 58.3 | 54.2 |
| MD Tear | g/um | 6.3 | 5 | 4.7 | 4.3 | 4.5 |
| TD Tear | g/um | 14.8 | 10.7 | 5.6 | 3.4 | 3.2 |
| MD/TD Tear Balance Ratio | | 0.43 | 0.47 | 0.84 | 1.26 | 1.4 |
| Dart | g/um | 27.8 | 27.8 | 27.8 | 27.8 | 23.6 |
| Puncture | J | 2.9 | 3.32 | 2.88 | 2.77 | 3.19 |
| Creep in MD, 500 g, 50° C., 5 h | % | 74.7 | 49.3 | N/A | 4.7 | 2.7 |
| Creep in TD, 500 g, 50° C., 5 h | % | 255.7 | 199.3 | N/A | 15.3 | 10.6 |

As shown in Table 11, the addition of certain amount of COC in Exceed™ XP 8656 could increase the stiffness. For tensile strength, the addition of COC decreases the strength in MD, but has minor influence on TD, and the MD/TD balance could be reached with addition of COC. For toughness properties, the addition of COC has minor influence on dart impact and puncture resistance. It should be noted that the creep resistance is obviously improved by the addition of COC, which is a potential for HDS/MDS application.

As used herein, "consisting essentially of" means that the claimed article or polymer includes only the named components and no additional components that will alter its measured properties by any more than 20, or 15, or 10%, and most preferably means that "additives" are present to a level of less than 5, or 4, or 3, or 2 wt % by weight of the composition. Such additional additives can include, for example, fillers, nucleators or clarifiers, colorants, antioxidants, alkyl-radical scavengers (preferably vitamin E, or other tocopherols and/or tocotrienols), anti-UV agents, acid scavengers, curatives and cross-linking agents, aliphatic and/or cyclic containing oligomers or polymers (often referred to as hydrocarbon resins), and other additives well known in the art. As it relates to a process, the phrase "consisting essentially of" means that there are no other process features that will alter the claimed properties of the polymer, polymer blend or article produced therefrom by any more than 10, 15 or 20%, but there may otherwise be minor process features not named.

For all jurisdictions in which the doctrine of "incorporation by reference" applies, all of the test methods, patent publications, patents and reference articles are hereby incorporated by reference either in their entirety or for the relevant portion for which they are referenced.

The invention claimed is:

1. A polyethylene film comprising a polymer composition, wherein the polymer composition comprises: from 75 wt % to 99 wt % of a metallocene linear low density polyethylene (LLDPE) based on the weight of the polymer composition, and from 1 wt % to 25 wt % of a cyclic olefin copolymer based on the weight of the polymer composition, wherein:
   the metallocene LLDPE
      comprises from 80 wt % to 99 wt % ethylene derived units and 1 wt % to 20 wt % units derived from one or more $C_3$ to $C_{20}$ α-olefins;
      a hafnium concentration of greater than 5 ppm by weight;
      has a density in the range of from 0.905 g/cm$^3$ to 0.930 g/cm$^3$;
      has a melt index ($I_2$) in the range of from 0.1 g/10 min to 2.0 g/10 min;
      has a melt index ratio (MIR) in the range of from 25 to 80; and
      has a molecular weight distribution (MWD) in the range of from 1.5 to 5.5; and
   the cyclic olefin copolymer has a glass transition temperature ($T_g$) of greater than 100° C. as measured by DSC method, and wherein the cyclic olefin copolymer comprises greater than 70 wt % of or more cyclic olefin derived units by weight of the cyclic olefin copolymer.

2. The polyethylene film of claim 1, wherein the cyclic olefin copolymer is present within a range from 5 wt % to 20 wt % based on the weight of the polymer composition.

3. The polyethylene film of claim 1, wherein the cyclic olefin copolymer has a glass transition temperature ($T_g$) within a range from 110° C. 80° C. to 200° C. as measured by DSC method.

4. The polyethylene film of claim 1, wherein the cyclic olefin derived unit is selected from $C_5$ to $C_{20}$ cyclic-olefin derived units.

5. The polyethylene film of claim 1, wherein the cyclic olefin derived unit is selected from norbornenes, tetracyclododecene, or a combination thereof.

6. The polyethylene film of claim 1, wherein low density polyethylene is absent from the film.

7. The polyethylene film of claim 1, wherein the metallocene linear low density polyethylene is a copolymer comprising within a range from 0.5 to 20 wt % $C_4$ to $C_{12}$ α-olefin derived units by weight of the copolymer, the remainder of the copolymer comprising ethylene-derived units.

8. The polyethylene film of claim 1, wherein the metallocene linear low density polyethylene has a peak melting point temperature ($T_m$) within a range of from 90° C. to 130° C.

9. The polyethylene film of claim 1, wherein the metallocene linear low density polyethylene has an $I_2$ (2.16 kg/190° C.) within a range from 0.2 g/10 min to 1.0 g/10 min.

10. The polyethylene film of claim 1, wherein the metallocene linear low density polyethylene has the following properties:
   a molecular weight of from 15,000 to 400,000 g/mol;
   a molecular weight distribution ($M_w/M_n$) of from 1.5 to 5.0;
   a hafnium to zirconium ratio (ppm/ppm) ≥1.0.

11. The polyethylene film of claim 1, wherein the film has the following properties:
   a TD shrink within a range from 10 to 40%;
   a TD shrinking force within a range from 5 to 50 mN;
   an MD shrink within a range from 35 to 90%;
   an MD shrinking force within a range from 20 to 100 mN;
   a 1% TD secant flexural modulus of at least 200 MPa;
   a 1% MD secant flexural modulus of at least 200 MPa; and
   a plateau seal strength of at least 14 N.

12. The polyethylene film of claim 1, wherein the film comprises at least a core layer and at least one other layer adjacent thereto, the core layer comprising the polymer composition.

13. The polyethylene film of claim 12, wherein the core layer is sandwiched between two skin layers.

14. The polyethylene film of claim 13, wherein each skin layer independently comprises at least 50 wt % of a linear low density polyethylene by weight of each skin layer, wherein the linear low density polyethylene of each skin layer is the same as or different than the linear low density polyethylene of the core layer.

15. The polyethylene film of claim 13, further comprising a sub-skin layer sandwiched between the core layer and each skin layer.

16. The polyethylene film of claim 15, wherein each sub-skin layer independently comprises at least 50 wt % linear low density polyethylene by weight of each sub-skin layer.

17. The polyethylene film of claim 12, wherein each skin layer comprises a metallocene polyethylene having a density within a range from 0.88 g/cm$^3$ to 0.910 g/cm$^3$ and a melt index in the range of from 0.2 g/10 min to 3.0 g/10 min.

18. The polyethylene film of claim 12, having a TD shrink of at least 18%.

19. The polyethylene film of claim 12, having a thickness at least 10% less than that of a polyethylene film free of the cyclic olefin copolymer but otherwise identical.

20. The polyethylene film of claim 12, having a thickness at least 15% less than that of a polyethylene film free of the cyclic olefin copolymer but otherwise identical.

21. The polyethylene film of claim 12, having a thickness at least 20% less than that of a polyethylene film free of the cyclic olefin copolymer but otherwise identical.

22. A shrink film comprising the polyethylene film of claim 12.

23. A process comprising extruding the polyethylene film of claim 12 at a melt temperature at the die of 238° C. or less.

24. A process comprising extruding the polyethylene film of claim 12 at a melt pressure of 42 MPa or less.

* * * * *